United States Patent [19]

Muramatsu

[11] Patent Number: 5,109,370
[45] Date of Patent: Apr. 28, 1992

[54] INFORMATION READING DEVICE FOR INFORMATION RECORDING MEDIUM HAVING TRACK STRUCTURE

[75] Inventor: Eiji Muramatsu, Tokorozawa, Japan

[73] Assignee: Pioneer Electronic Corporation, Tokyo, Japan

[21] Appl. No.: 549,195

[22] Filed: Jul. 6, 1990

[30] Foreign Application Priority Data

Jul. 10, 1989 [JP] Japan .................................. 1-177622

[51] Int. Cl.⁵ .............................................. G11B 3/78
[52] U.S. Cl. ........................................ 369/60; 369/95
[58] Field of Search ................. 369/60, 44.32, 44.37, 369/95, 93; 360/75, 77.02

[56] References Cited

U.S. PATENT DOCUMENTS

| 4,419,700 | 12/1983 | Ragle et al. | 369/77.02 |
| 4,701,897 | 10/1987 | Nakagawa | 369/44.32 |
| 4,722,079 | 1/1988 | Matsumoto | 369/44.32 |
| 4,982,395 | 1/1991 | MacAnally | 369/44.37 |

Primary Examiner—David J. Severin
Attorney, Agent, or Firm—Sughrue, Mion, Zinn Macpeak & Seas

[57] ABSTRACT

An optical pickup scans a target track and scans a track preceding to the target track to store respectively read information therefrom to read out information from a preceding track scanning signal corresponding to a jump portion when a track jump occurs, thus to combine it into normal read information.

5 Claims, 3 Drawing Sheets

×: OCCURRENCE OF TRACK JUMP

| | | | ↓ | | | | TIME → |
|---|---|---|---|---|---|---|---|
| A | $A_n$ | $A_{n+1}$ | ~~$A_{n+2}$~~ | $A_{n+3}$ | $A_{n+4}$ | $A_{n+5}$ | ... |
| B | $B_{n+1}$ | $B_{n+2}$ | ~~$B_{n+3}$~~ | $B_{n+4}$ | $B_{n+5}$ | $B_{n+6}$ | ... |
| C | $B_n$ | $B_{n+1}$ | $B_{n+2}$ | ~~$B_{n+3}$~~ | $B_{n+4}$ | $B_{n+5}$ | ... |
| SELECT | A | A | B | A | A | A | |
| D | $A_n$ | $A_{n+1}$ | $B_{n+2}$ | $A_{n+3}$ | $A_{n+4}$ | $A_{n+5}$ | |
| E | $A_{n-1}$ | $A_n$ | $A_{n+1}$ | $B_{n+2}$ | $A_{n+3}$ | $A_{n+4}$ | |

INFORMATION READING DEVICE FOR INFORMATION RECORDING MEDIUM HAVING TRACK STRUCTURE

BACKGROUND OF THE INVENTION

1. Field of the Invention

This invention relates to a device for reading information recorded on a recording medium which has a track structure such as a compact disks (DC), or a laser vision disk (LVD), etc.

2. Prior Art

Generally, recording of information onto an optical disk is carried out at a prescribed velocity (linear velocity or angular velocity). The information are recorded in succession onto spiral tracks in a state where they are put in order in time series manner. In the case of reading recorded information from such an optical disk to play back or reproduce it, a reading signal from an optical pickup is outputted as a playback signal on a real time basis.

To precisely read such record information, tracks must be correctly scanned or traced. In view of this, it has been conventionally ordinary to carry out a tracking servo control in order to modify or correct a tracking error by using means such as the three-beam method, or the push-pull method, etc.

As described above, the conventional reading device is adapted to correctly tracing the tracks by the tracking servo control. In the case where a strong impact or shock from the outside is applied thereto, however, it might take place that a light spot by the optical pickup moves or shifts to the position outside the tracking servo control range. This phenomenon is called a "track jump". Where such a track jump takes place, a light spot would move onto tracks except for tracks to be originally scanned. For this reason, a phenomenon of a sound jump appears as a playback sound. There is the possibility that such a track jump may occur not only in CD players but also in LVD players.

It is to be noted that this track jump is produced by external causes, and is therefore distinguished from an intentional or forced track jump for trick play or search.

SUMMARY OF THE INVENTION

An object of the invention is to provide a reading device in which there is no possibility that any break in playback such as a sound jump, etc. may occur even in the case where a track jump due to impact, etc. takes place.

To solve the above-described problems, this invention provides a device for reading information put in order in time series manner from a recording medium having a spiral track on which the information is recorded in succession, which comprises: first scanning means for scanning a target track; second scanning means for scanning a preceding track at a position preceding in terms of time at all times to the target track; memory means for individually storing information read by the first and second scanning means, respectively; and means for reading out information corresponding to information recorded on the target track subject to track jump from the memory means which has stored information beforehand by the second scanning means when a track jump of the first scanning means occurs to combine it into normal reading information to thereby generate output data put in order in the time series manner and output them.

In accordance with this invention, the first scanning means scans the target track, and at the same time, the second scanning means scans, in parallel, the track (e.g., track on the outer circumferential side where information are recorded from the inner circumferential side toward the outer circumferential side) preceding in terms of time at all times to the target track. Respective informations read from these first and second scanning means are individually stored into memory means. Accordingly, the same information as record information of the target track are read in advance by the second scanning means and is then stored into the memory means. Now, where a track jump takes place in connection with a target track, record information of the jumped track is read out from the memory circuit by output data generating means, and is then combined into normal read information. Thus, output data put in order in time series manner are generated. As a result, a break in playback due to the track jump can be prevented.

DESCRIPTION OF THE PREFERRED EMBODIMENT

A preferred embodiment of this invention will be described with reference to the attached drawings.

Figure 1:
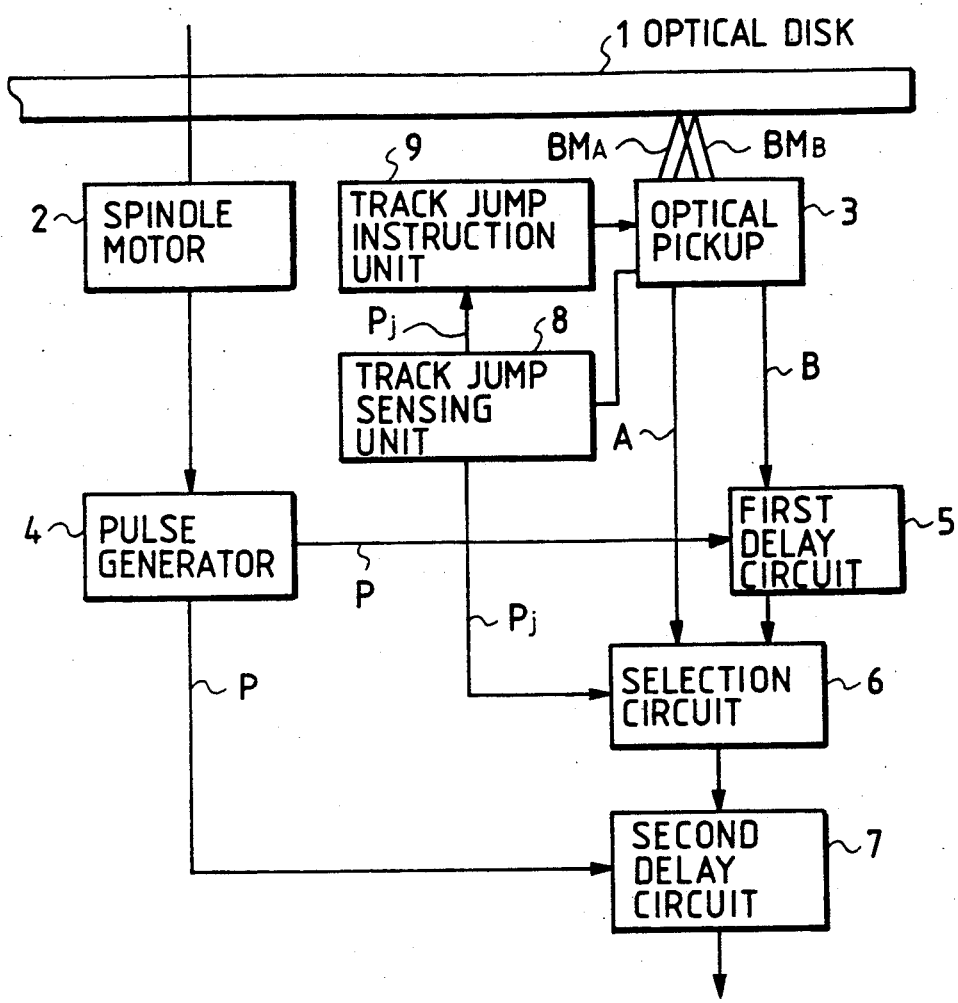
FIG. 1 is a block diagram showing an embodiment of this invention.
Figure 2:
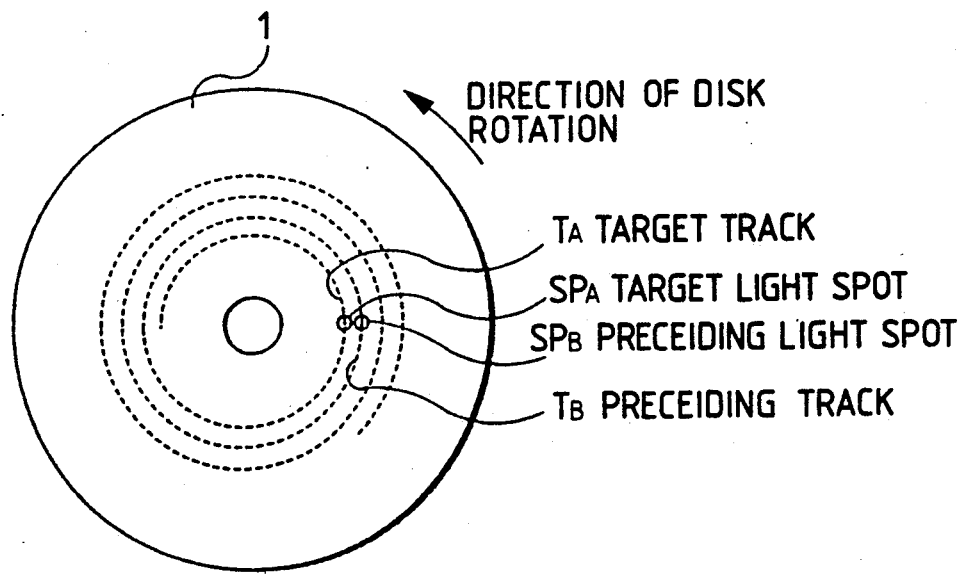
FIG. 2 is an explanatory view of the positional relationship of two light spots.

Referring to FIG. 1, there is shown an embodiment of an information reading device according to this invention. In FIG. 1, an optical disk 1 is rotated by a spindle motor 2. More particularly, this optical disk 1 is rotated in a manner that it is scanned at a constant linear velocity (CLV) or a constant angular velocity. In accordance with this rotation, two independent light beams $BM_A$ and $BM_B$ are irradiated onto the optical disk 1 from an optical pickup 3. As shown in FIG. 2, the light beam $BM_A$ is irradiated so that a light spot $SP_A$ is formed onto a target track $T_A$ and a light beam $BM_B$ is irradiated so that a light spot $SP_B$ is formed onto an adjacent track (hereinafter referred to as a preceding track) $T_B$ preceding at all times to the target track $T_A$.

In accordance with the rotation of the spindle motor 2, a pulse generator 4 generates pulses P to output them to a first delay circuit (memory means) 5 and a second delay circuit (memory means) 7. The first delay circuit 5 delays preceding information B by the light spot $SP_B$ by a predetermined time to output it to a selection circuit 6. On the other hand, the target information A read by the light spot $SP_A$ is directly inputted to the selection circuit 6. The selection circuit 6 selects either the target information A or the preceding information B in dependency upon a sensed signal Pj from a track jump sensing unit 8 to output the selected information to the second delay circuit 7. The selected information is delayed by a predetermined time by the second delay circuit 7, and is then outputted as information train put in order in time series manner. The sensed signal Pj is also delivered to the track jump instruction unit 9.

The track jump instruction unit 9 serves to forcedly jump the light spot $SP_A$ on the basis of the sensed signal Pj so that it is returned to an original correct track $T_A$ in the case where the light spot $SP_A$ is located at an erroneous track position caused by a track jump produced by external causes.

The operation of the information reading device will now be described.

Figure 3:
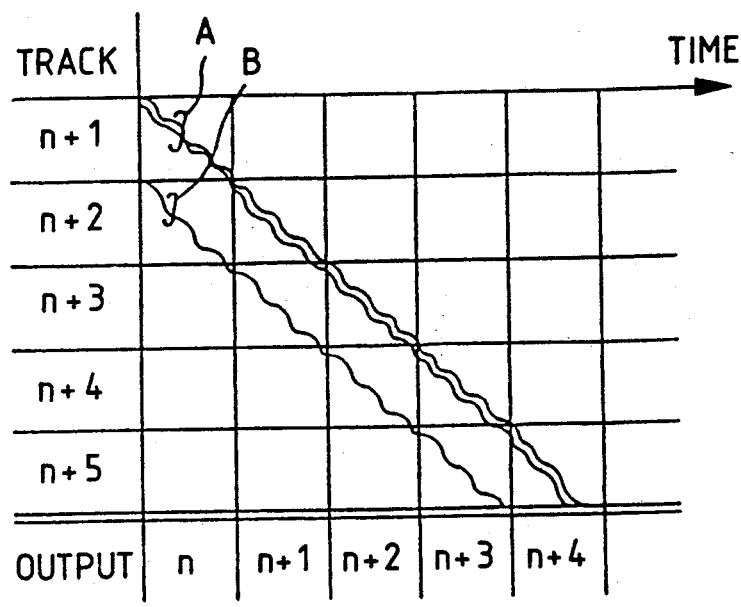
FIG. 3 is an explanatory view of the operation in a normal reading state.

In a normal state where no track jump takes place, the light spots $SP_A$ and $SP_B$ by the optical pickup 3 scan the reading objective track (target track) $T_A$ and the preceding track $T_B$ which is adjacent to each other to output two signals of the target information A and the preceding information B, respectively. The pulse generator 4 obtains information of rotation from the spindle motor 2 to send one pulse P every time the optical disk 1 makes one rotation to each of the first and second delay circuits 5 and 7. The target information A is sent to the selection circuit 6, and the preceding information B is sent to the first delay circuit 5. The first delay circuit 5 delays the preceding information B by a time corresponding to one track on the basis of the pulse P thereafter to send it to the selection circuit 6. The selection circuit 6 selects the target information A in an ordinary state (in a normal state where no track jump is produced) to output it to the second delay circuit 7. The second delay circuit 7 delays the target information A read by a time corresponding to one track and outputs it. The operation in a normal state as stated above is shown in FIG. 3. As seen from this FIG. 3, tracks at the time of scanning and tracks of read information outputted are shifted by a distance corresponding to one track. Namely, e.g., at the time of scanning an (n+1) track, target information A on an n track is outputted. At this time, the preceding information B is outputted in parallel with the target information A. However, this information B is not used for output data, but is only updated in sequence at the first delay circuit 5.

Figure 4:
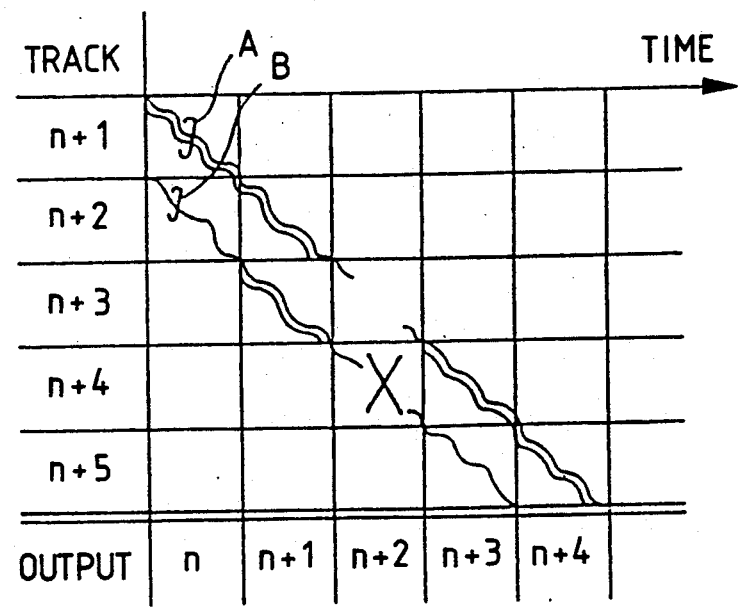
FIG. 4 is an explanatory view of the operation when a track jump occurs.

Assuming now that a track jump occurs for any cause (see FIG. 4), the track jump sensing unit 8 senses a track jump. For this sensing method, there is a conceivable a method for sensing occurrence of a track jump itself from the fact that a tracking error signal is larger than a predetermined value and for sensing occurrence state from the number of times (the number of jump tracks) thereof, or the like. The sensed signal Pj is sent to the selection circuit 6 and the track jump instruction unit 9. The track jump instruction unit 9 controls the optical pickup 3 so that light spots $SP_A$ and $SP_B$ are shifted back to tracks to be originally scanned. The selection circuit 6 carries out a selective operation in which a state where the target information A is selected is shifted to a state where the preceding information B is selected to send the preceding information B to the second delay circuit 7.

Figures 5, 6:
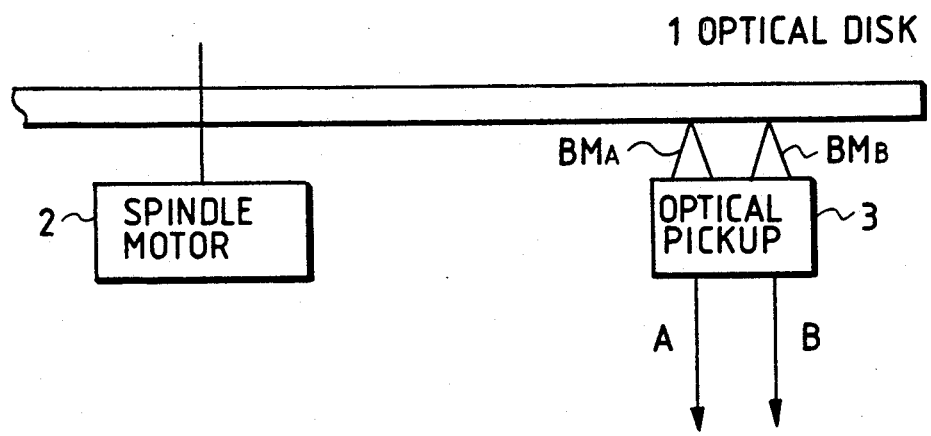
FIG. 5 is an explanatory view of an actual example when a track jump occurs.
FIG. 6 is a block diagram showing an alternate embodiment of the invention.

The detailed operation thereof will be described with reference to FIG. 5.

It is now assumed that a track jump has occured at a time point indicated by the mark X. At this time, read target information $A_{n+2}$ and preceding information $B_{n+3}$ have not been yet read. However, the preceding information $B_{n+2}$ is delayed by the first delay circuit 5. The information $B_{n+2}$ delayed by one track of the preceding information B read by the light spot $SP_B$ is delivered to the second delay circuit 7 as an output D from the selection circuit 6. This preceding information $B_{n+2}$ is combined into the train of read information $A_n$ and $A_{n+1}$. As indicated by D, a train of signals such as $A_n, A_{n+1}, B_{n+2}, A_{n+3}...$ is generated and is outputted as indicated by actual output data E.

As stated above, an approach is employed to carry out a multi-reading to allow read target information A late in terms of time of information subjected to the multi-reading to output data at all times, and to use, as correction data, the preceding information B preceding in terms of time when a track jump takes place. Accordingly, successive output data put in order in time series manner can be provided. Thus, a break in playback such as a sound jump, etc. can be prevented.

While is has been described that the optical disk is used as an example, this invention is not limited to this implementation, but is applicable to the whole disk-shaped recording media having a track structure. Further, while it has been described that light spots $SP_A$ and $SP_B$ trace adjacent tracks $T_A$ and $T_B$, scanning may be carried out at intervals corresponding to several tracks as shown in FIG. 6.

Furthermore, a plurality of optical pickups 3 may be used to provide target information A and preceding information B. In addition, two light spots or more may be used to carry out multi-storage to thereby obtain safety of the backup.

As described above, this invention employs a scheme to carry out reading of information on different tracks with a time difference therebetween by a plurality of scanning means and store them, thus to fill information lost by track jump with stored information. Thus, continuous information free from a break in playback can be outputted.

What is claimed is:

1. A device for reading information put in order in time series manner from a recording medium having a spiral track on which said information is recorded in succession, which comprises:
   first scanning means for scanning a target track;
   second scanning means for scanning a preceding track at a position preceding in terms of time at all times to said target track;
   memory means for individually storing information read by said first and second scanning means, respectively, and
   means for reading out information corresponding to information recorded on the target track subject to track jump from the memory means which has stored the information read by said second scanning means beforehand when a track jump of said first scanning means occurs to combine it into normal read information to thereby generate output data put in order in said time series manner and output them.

2. An information reading device as set forth in claim 1, wherein said recording medium is an optical disk, said first and second scanning means being provided within an optical pickup.

3. An information reading device as set forth in claim 1, which further comprises a track jump sensing unit for sensing a track jump, said means for reading out information being operative to read out, on the basis of a sensed signal from said track jump sensing unit, preceding information read by said second scanning means to combine it into normal read information.

4. An information reading device as set forth in claim 1, wherein target information read by said first scanning means is directly inputted to said memory means, preceding information read by said second scanning means being delayed by a predetermined time through a first delay circuit and inputted to said memory means, said means for reading out information, having a second delay circuit, output data being delayed by a predetermined time through said second delay circuit and outputted therefrom.

5. An information reading device as set forth in claim 3, wherein said first and second delay circuits are controlled by a pulse generator for generating pulses in accordance with rotation of a spindle motor.

* * * * *